United States Patent [19]

Liu et al.

[11] Patent Number: 4,652,918
[45] Date of Patent: Mar. 24, 1987

[54] COMPENSATING CIRCUIT

[75] Inventors: Thomas P. Liu; Hussam E. Eassa, both of New Berlin, Wis.

[73] Assignee: General Electric Company, Milwaukee, Wis.

[21] Appl. No.: 708,131

[22] Filed: Mar. 4, 1985

[51] Int. Cl.⁴ ............................................. H04N 5/32
[52] U.S. Cl. .................................. 358/111; 358/166; 378/99
[58] Field of Search .................. 378/99; 358/111, 160, 358/166–167, 184, 282

[56] References Cited

U.S. PATENT DOCUMENTS 4,058,832 11/1977 Vagi ..................................... 358/111
4,091,420 5/1978 Omori et al. ........................ 358/167
4,575,758 3/1986 Egeröd et al. ...................... 358/166

OTHER PUBLICATIONS

"A Real-Time Electronic Imaging System for Solar X-Ray Observations From Sounding Rockets" by Davis et al., Space Science Instrumentation vol. 5 (1979), pp. 51–71.

Primary Examiner—Craig E. Church
Assistant Examiner—John C. Freeman
Attorney, Agent, or Firm—Douglas E. Stoner; Alexander M. Gerasimow

[57] ABSTRACT

An x-ray video imaging system including a compensation circuit for reducing the amplitude of the low frequency component of a video signal when the total amplitude of the video signal approaches a maximum level beyond which information would be lost due to circuit or device limitations.

11 Claims, 8 Drawing Figures

FIG.3.B

COMPENSATING CIRCUIT

BACKGROUND OF THE INVENTION

This invention relates to imaging systems and, more particularly, to imaging systems using video displays.

Video displays are becoming ever more popular in medical imaging systems. For example, U.S. Pat. No. 3,894,181, issued to Mistretta, et al on July 8, 1975, U.S. Pat. No. 3,848,130, issued to Macovski on Nov. 12, 1974 and U.S. Pat. Nos. 4,204,225 and 4,204,226, issued to Mistretta on May 20, 1980, describe x-ray systems using video display systems. A number of advantages are obtained by utilization of video displays in place of conventional film displays. For example, images can be viewed in real time, without waiting for a film processing step, and video images are easier to digitize and process by computer than photographic images. In addition, archiving a video image can be done relatively inexpensively on magnetic tape or discs.

The advantages of video systems have been sufficient to cause their increasing popularity despite certain disadvantages inherent with video systems. For example, video displays have less dynamic range than photographic film and are more likely to be subjected to overload conditions caused by high signal strengths. The conventional solution for preventing system overload, or blooming, resulting from high signal strength is the incorporation of gamma correction in the video system. Gamma correction, simply stated, is a non-linear circuit response which reduces display contrast. Use of gamma correction has the advantage that high amplitude signals are relatively attenuated, and, therefore, the system is less likely to overload. However, there are significant disadvantages associated with gamma correction in certain environments. Most significantly, gamma correction normally causes some signal attenuation even at relatively low signal levels, where none is really needed. In addition, the attenuation characteristics of conventional gamma correction are frequency independent. This is a drawback in certain applications. For example, in medical imaging, frequently the high frequency information in the video signal will carry with it most of the diagnostically useful information, but the low frequency information upon which it is superimposed will display higher amplitude variations and, thus, cause overloading of video equipment which can mask the lower amplitude, but more useful, high frequency information.

As an illustration of the foregoing, consider an x-ray imaging system used to provide an image of a human patient in the chest area. One side of the patient will be uniformly irradiated with x-radiation, and the radiation passing through the patient will be detected on the other side. Typically, detection is performed by an x-ray image intensifier tube. A television camera views the optical output of an x-ray image intensifier tube. Consider the area near the heart. Each horizontal scan line in the camera will initially view a low level signal resulting from highly attenuated radiation that has passed essentially parallel to the sides of the chest wall of the patient, then view a signal resulting from radiation which has passed through the lung area of the patient and, thus, is not highly attenuated because of the substantial amount of air in the patient's lungs. The next portion of the signal will be low level due to the highly attenuated radiation that has passed through the spinal column and possibly through the heart area. Then, there is a high level signal from radiation that has passed through the lungs and, finally, a highly attenuated signal due to the chest wall. If the physician sets his video system so that he can view soft tissue in the heart area, he must use a relatively high gain setting and high x-ray intensity due to the high attenuation of x-rays in the heart area. However, the high gain and intensity cause the image in the lung area to display such a high average intensity that fine structural details in the lung area are lost because the video circuits and components, such as video cameras and CRT displays, become overloaded. This is generally manifested on the video display as blooming. Conversely, if the gain is set to a low level to view the lung area, no usable image of the heart area is formed.

Conventional gamma correction circuits address this problem by decreasing the video intensity in the lung area. However, since these gamma correction circuits are frequency insensitive, the amplitude of the useful high frequency information is severely attenuated making the images less useful diagnostically.

SUMMARY OF THE INVENTION

This invention is characterized by a compensation system with an input for receiving video input signal and an output for providing output video signals. A threshold detector monitors the input video signal and, based on the amplitude thereof, selects input signals requiring compensation. With respect to those signals requiring compensation, a compensation circuit isolates the low frequency components thereof and then subtracts from the original input signal a low frequency signal that is derived from the low frequency component of the input signal as by lowering the D.C. value with a threshold circuit and changing, generally lowering, the amplitude. The net effect of the subtraction is to reduce the amplitude of the low frequency component, therefore reducing the total amplitude of the signal, while preserving the diagnostically useful high frequency component. A bypass circuit delivers input signals not requiring compensation directly to the output. An advantage of the system, in addition to retention of the useful high frequency component, is that there is no alteration to a signal if its amplitude is not sufficient to require compensation. Thus, signals having a level below the threshold level are passed directly to the output with nothing subtracted therefrom.

A feature of the invention is a delay circuit to ensure that the low frequency signals subtracted from input signals requiring compensation are substantially in phase with the input signal to be compensated. An advantage of this is that it prevents low frequency phase differences in the compensated output signal which could be erroneously interpreted as high frequency diagnostic information. As will be explained more fully below, the delay circuit can be either in the compensation circuit, or it can be in the bypass circuit.

Another feature of the invention is the inclusion of an input low-pass filter. The input low-pass filter can be used when the delay circuit is in the compensation circuit. In that case, the input low-pass filter provides a filtered input signal to the delay circuit. The purpose of filtering the input signal prior to the delay circuit is that delay circuits often have clocks which, when forming beat signals with relatively high frequency signals, may generate signals of frequencies approximating video signal frequencies, thereby possibly degrading performance of the video system.

It is, therefore, an object of this invention to provide a video compensating system which passes unmodified video signals having an amplitude low enough that no distortion, or blooming, will be caused in video systems or components, but which provides signals having reduced low frequency amplitude, but not reduced high frequency amplitude, in response to signals having amplitudes high enough that blooming could result.

BRIEF DESCRIPTION OF THE DRAWINGS

The features of the invention believed to be novel are set forth with particularity in the appended claims. The invention itself, however, both as to its organization and method of operation, together with further objects and advantages thereof, may best be understood by reference to the following description taken in conjunction with the accompanying drawings in which:

FIGS. 3A through 3E show waveforms from various points in the circuit of FIG. 2 in order to illustrate its operation.

DESCRIPTION OF THE PREFERRED EMBODIMENT

Figure 1:
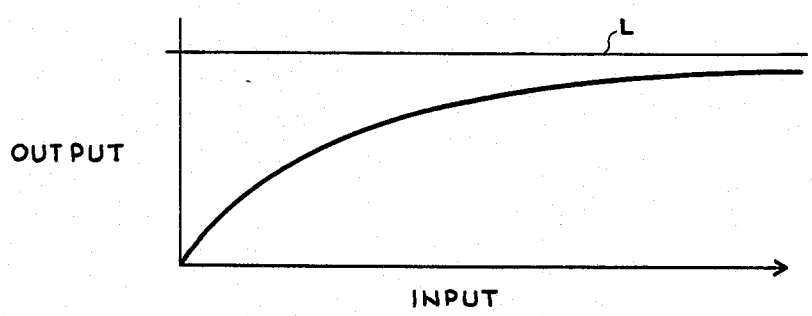
FIG. 1 is a graph illustrating typical response of a circuit employing conventional gamma correction.

Referring first to FIG. 1, there is shown a curve illustrating typical response of a circuit employing conventional gamma correction. For many applications, it is recognized that a simple linear correlation of output to input in a video circuit could cause output signal levels to exceed a limit, shown here and in subsequent Figures as a solid line labelled L. By employing the type of non-linear relationship illustrated in FIG. 1 a much wider range of input amplitude can be tolerated without causing the output amplitude to exceed the limit L. However, as previously stated, while this is a useful technique for certain applications, it is not optimal in application in which the low frequency component of the signal is responsible for wide variations in input signal level, but is less useful as compared to high frequency information.

Figure 2:
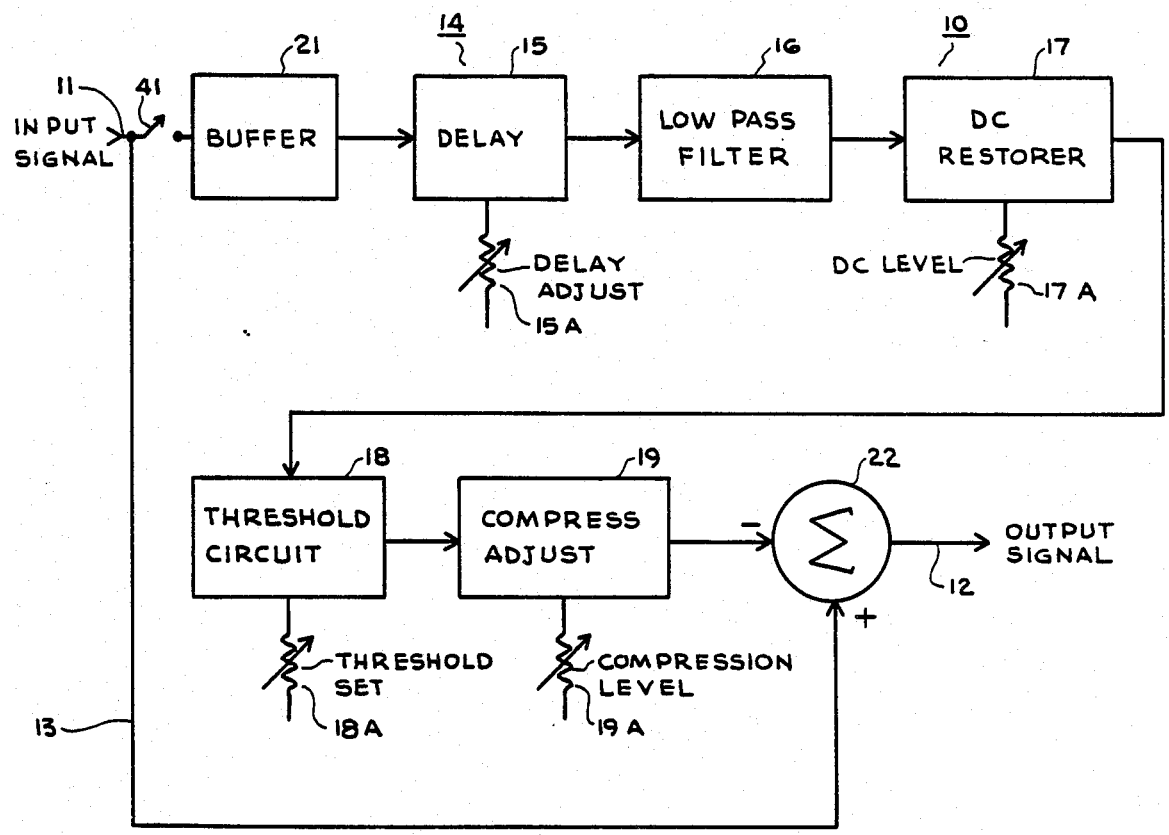
FIG. 2 is a block diagram of the preferred embodiment of the subject invention.

Referring next to FIG. 2, there is shown a block diagram of a compensation system 10 useful in applications such as imaging systems, including x-ray imaging systems, employing video signal processing or display. An input 11 receives uncompensated video signals and an output 12 delivers those video signals, compensated as necessary, to conventional circuitry in the imaging system. A bypass line 13 is provided to deliver input signals not requiring compensation directly to the output 12. A compensation circuit 14, including a delay circuit 15, a low-pass filter 16, a d.c. restorer 17, a threshold circuit 18, and a compression adjust circuit 19, also samples each input signal through a buffer 21 and a switch 41. Each of the circuits 15 through 19 and 21 is conventional in design.

Any output from the compression adjust circuit 19 is subtracted from the input signal in a summing node 22. The output of the summing node 22 is the compensation system output 12.

Operation of the compensation system is best understood by taking FIGS. 3A through 3E in conjunction with FIG. 2. FIGS. 3A through 3E are waveforms from various parts of the compensation system 10, all shown on a common time axis.

Figure 3A:
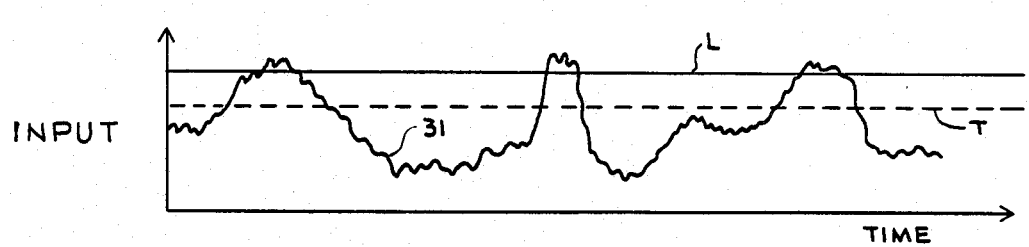

Illustrated in FIG. 3A is a typical video input signal 31 containing high frequency information superimposed on low frequency information. It is apparent from FIG. 3A that the high frequency information is of a substantially lower peak-to-peak amplitude than the low frequency information.

In a typical medical imaging system, the curve 31 in FIG. 3A may, for example, correspond to the video signal obtained in a single horizontal sweep of the video camera. The high frequency information thereon will contain information relating to small density changes within the body being imaged. Such small density changes can be caused, for example, by small lesions within the body or small blood vessel structure. It is usually the small density changes that are clinically significant in an x-ray imaging system utilizing video display or signal processing.

The large amplitude low frequency variations in the signal may be caused by major density differences within the body, such as the density difference between bone and surrounding tissue or the density difference between an image of the heart area, which is relatively dense, and the neighboring lung area, which is of low density. If a physician is using an imaging system to detect large density differences, such as to confirm a suspected broken bone, he will normally use a film-based system. In such a study, the relatively low amplitude high frequency information is of less interest. However, if the high frequency information becomes of interest, current medical imaging technology frequently involves the use of computer enhancement of images. When computer enhancement is employed, video processing and display is normally used. Thus, generally, in a video imaging system, be it x-ray, ultrasound, nuclear, or NMR based, the high frequency information is of greater interest.

As shown in FIG. 3A, the signal exceeds the upper limit L in three areas. Thus, it would be expected that distortion, or blooming, will manifest itself in the video display system in these three areas of the horizontal sweep line. The compensation system 10 is designed to prevent such blooming while preserving the full high frequency signal.

An input signal represented by the curve 31 in FIG. 3A passes through the buffer 21 and the delay 15. The purpose of the delay 15 will be explained in greater detail below. The delayed signal is then passed to the low-pass filter 16. In the low-pass filter 16, the high frequency component of the signal is removed and only the low frequency component is passed to the d.c. restorer 17. This low frequency component is illustrated by a curve 32 in FIG. 3B. The amplitude of the low frequency component is then be compared to a preselected threshold to select the portions of the particular input signal requiring compensation. However, since a.c. capacitive coupling can frequently cause varying d.c. levels dependent on the signal content, the low frequency component is passed through the d.c. restorer 17 to reestablish the d.c. information in the signal before it is compared with the set reference in the threshold detector 18. As in any conventional d.c. restorer, the d.c. level is adjusted to be compatible with the remainder of the system by means of a potentiometer 17A.

The threshold detector 18 is set to pass therethrough only portions of the low frequency signal that exceeds a predetermined threshold. The predetermined threshold is illustrated in FIGS. 3A and 3B, and subsequent Figures, as a broken line T. The threshold level is set by means of a potentiometer 18A.

Figure 3C:
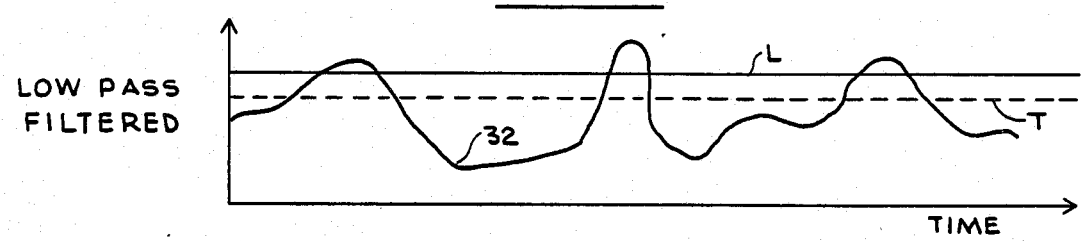
Figure 3C:
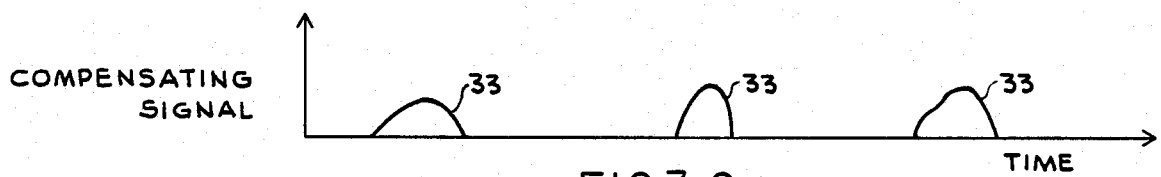

FIG. 3C illustrates the compensation signal 33 coming from the threshold circuit. Signal 33 is present only in the three areas where the low frequency signal exceeded the threshold level T. Since the compensating signal is dependent upon the difference between the threshold and the low frequency component of the input signal, it is only the portions of the input signal which require compensation that give rise to the compensating signal 33.

Figure 3D:
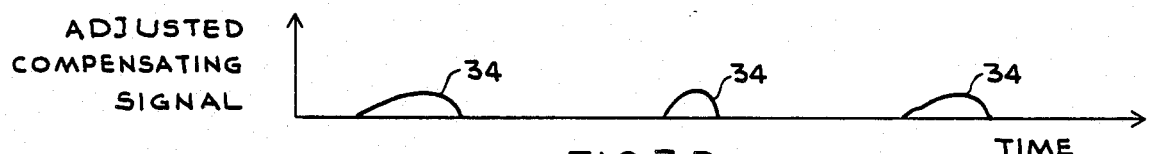

The compensating signal is then pased to the compression adjust circuit 19 where its amplitude is altered as illustrated by the adjusted compensating signal 34 in FIG. 3D. The degree of adjustment is controlled by a potentiometer 19A.

Figure 3E:
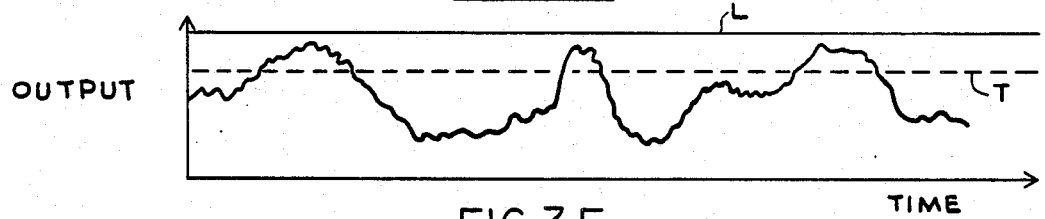

The adjusted compensating signal 34 is then subtracted from the input signal 31 in the summing node 22 providing a compensated, or output, signal illustrated by the curve 35 in FIG. 3E. It will be observed that the signal 35 is identical to all portions of the curve 31 below the threshold level T. However, where the curve 31 exceeded the level T, the corresponding low frequency component thereof in curve 35 has been reduced so that while the level T is still exceeded by the curve 35, the limit L, above which blooming or clipping would occur, in video components or systems, is never exceeded. However, it is important to realize, only the low frequency component of the curve 35 above the level T has been affected. The diagnostically significant high frequency component remains unaltered.

The several elements of the compensating circuit 14 cause a certain amount of time delay as a signal proceeds therethrough. Thus, the adjusted compensating signal suppleid by the compression-adjust circuit 19 to the summing node 22 will be somewhat delayed as compared to the input signal suppied directly to the node 22 through the bypass line 13. In order to avoid low frequency phase differences in the output signal, some additional compensation delay is used. A delay circuit could be installed in the bypass line 13. However, while a delay circuit in the bypass line 13 could effectively replicate the delay of the compensating circuit 14 and thus prevent low frequency phase differences in the output signal, this is not the preferable way to proceed. It is important that the high frequency information be accurately delivered in the output signal. It is the bypass line 13 that delivers the important high frequency information, as part of the main signal, to the output 12. A delay circuit in the bypass line 13 could cause a variation, or a degradation, of the accuracy of the high frequency information.

Therefore, in the preferred embodiment, the delay circuit 15 is placed in the compensation circuit 14. Recalling that this system is most useful in a video display system, it is realized that significant image differences do not generally occur from one horizontal scan line to the next. Therefore, it has been found that subtracting an adjusted compensating signal obtained from one horizontal scan line from the input signal of the following horizontal scan line provides an acceptable degree of accuracy and compensation. Thus, the delay adjust potentiometer 15A is set to provide a delay equal to that required for the video syste to make one horizontal sweep less the delay inherent in the remainder compensation circuit 14. Then, the adjusted compensating signal is registered with the input signal provided by the subsequent horizontal scan line and is subtracted therefrom.

It is recognized, however, that there may be applications when it is preferable to place the delay circuit 15 in the bypass line 13, as, for example, if a subsequent scan line cannot be used.

Typically, in a video imaging system used in a medical x-ray apparatus, the less useful low frequency information will be below 1 Mhz. Therefore, the low-pass filter should be designed to remove signal components in excess of 1 MHz. However, different systems and applications will function best with other frequency limits.

It should be noted that a typical delay circuit 15 will include a clock. It is desirable that the clock in the delay circuit 15 be phase locked to the normal video sync signals to ensure that the delay provided remains accurate with respect to the video sync signals.

An optional input low-pass filter, now shown, can be included between the buffer 21 and the delay circuit 15. If it is feared that signals of a certain frequency, generally in the diagnostically useful high frequency range, will beat with the clock frequency in the delay circuit 15 and cause undesirable beat signals which may degrade the fidelity of the high frequency component of the output signal, those high frequency signals that could cause such beats can be eliminated by an input low-pass filter prior to the delay circuit 15.

It is advisable in certain applications to include an input switch 41 which can disconnect the buffer 21 from the input 11. If the switch is positioned so as to disconnect the buffer 21 from the input 11, no compensating signal will be generated and, thus, the iput signal will always be provided directly to the output 12. This may sometimes be a useful check on system operation, or it can be used if the user wishes to view the original image, including the original low frequency portion. Then, simply by throwing the switch 41, the compensating system can be placed into operation.

Figure 4:
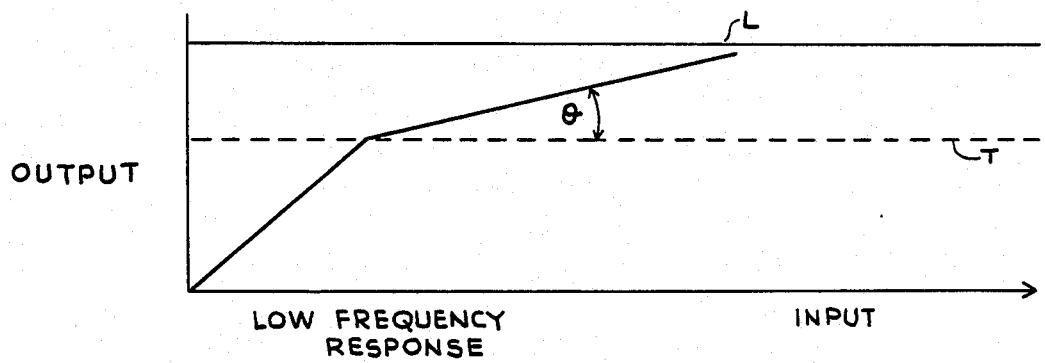
FIG. 4 is a graph illustrating typical low frequency response of a circuit employing the present invention.

Referring now to FIG. 4, there is shown a typical low frequency response curve of the compensating system 10. This is useful to compare to FIG. 1 to observe the difference between the response of the present system and the prior art. It must be emphasized that it is only the low frequency response illustrated in FIG. 4. As has been described, the high frequency component of the input signal is unaffected by the compensation system.

Referring to FIG. 4, the low frequency component of the input signal is unaffected until the output signal level exceeds the threshold level T. For all input signals which would give rise to an output in excess of the level T, the low frequency component thereof is reduced. The level of reduction, that is, the angle $\theta$ is controlled by the compression level control 19A. If the compression level control 19A is set to provide a very small adjusted compensating signal, there will be very little subtracted from the input signal in the summing node 22 and the output signal will be more nearly identical to the input signal, the angle $\theta$ will increase and the response curve of FIG. 4 will approach a straight line. On the other hand, if the compression level is set to provide a higher amplitude adjusted compensating signal, the angle $\theta$ will get smaller and even greater low frequency amplitude variations in the input signal can be tolerated while preserving the high frequency components.

Generally, all potentiometers 15A, 17A, 18A and 19A are set when the system is installed to compensate component value variations, and need not be adjusted as part of day-to-day operation.

Thus, in summary, this invention provides a system which attenuates the extreme high intensity low frequency components of a video signal which would therefore otherwise exceed maximum system dynamic range, while preserving the high frequency, useful components thereof.

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

The invention claimed is:

1. A compensation system for preventing video signal levels from exceeding maximum signal level limit which defines maximum signal levels that can be handled without loss of information, said compensation syst comprising:
   input means for receiving input signals;
   low pass filter means for isolating the low frequency components of such input signals;
   threshold means for comparing the low frequency components to a preselected threshold to determine whether an input signal requires compensation;
   compensation means coupled to said threshold means for creating compensated output signals in response to selected input signals, said compensation means comprising subtraction means for subtracting a signal dependent upon the difference between the preselected threshold and the low frequency component of such selected input signals from such selected input signals to create such compensated output signals;
   delay means in said compensation means to prevent low frequency phase differences in said subtraction means;
   bypass means for delivering input signals to said subtraction means; and
   output means coupled to said subtraction means for providing compensated output signals.

2. Compensation system for use in medical imaging systems which have a maximum signal level limit defining maximum signal levels that can be handled without loss of information, said compensation system comprising:
   input means for receiving input signals;
   low pass filter means for isolating the low frequency components of such input signals;
   threshold means for comparing the low frequency components to a preselected threshold to determine whether an input signal requires compensation wherein said threshold is lower than the maximum signal level limit;
   compensation means coupled to said threshold means for creating compensated output signals in response to selected input signals, said compensation means comprising subtraction means for subtracting a signal dependent upon the difference between the preselected threshold and the low frequency component of such selected input signals from such selected input signals to create such compensated output signals;
   bypass means for delivering input signals to said subtraction means; and
   output means coupled to said subtraction means for providing compensated output signals.

3. An X-ray video imaging system of claim 2 wherein said compensation system further comprises delay means to prevent low frequency phase differences in said subtraction means.

4. An X-ray video imaging system of claim 3 further comprising a DC restorer between said low pass filter means and said threshold means.

5. An X-ray video imaging system of claim 3 wherein said delay means is in said bypass means.

6. An X-ray video imaging system of claim 3 wherein said delay means is in said compensation means.

7. An X-ray video imaging system of claim 6 wherein said low pass filter means receives a delayed signal from said delay means and wherein said compensation system further comprises an input low pass filter for supplying a filtered input signal to said delay means.

8. Compensation system for use in imaging systems which have a signal level limit defining signal levels that can be handled without loss of information, said compensation system comprising:
   input means for receiving input signals;
   threshold means for determining whether an input signal requires compensation;
   compensation means coupled to said threshold means for creating compensated output signals in response to selected input signals, said compensation means comprising low frequency processing means for subtracting a portion of the low frequency component of such selected input signals from such selected input signals to create such compensated output signals, said compensation system further comprising delay means to prevent low frequency phase differences in said compensated output signal;
   bypass means for delivering input signals to said processing means; and
   output means coupled to said processing means for providing compensated output signals.

9. A compensation system of claim 8 wherein said delay means is in said bypass means.

10. A method of compensation to prevent blooming in video systems, said method comprising the steps of:
    sampling an uncompensated video input signal to determine if the low frequency components thereof exceed a predetermined amplitude threshold; and
    providing a compensated output signal by subtracting from such uncompensated video input signals a compensating signal dependent upon the difference between such low frequency components and said threshold.

11. A method of compensation to prevent blooming in video systems in accordance with claim 10 wherein said compensating signal is a compensating signal formed by reducing the amplitude of such difference between such low frequency components and said threshold.

* * * * *